United States Patent [19]

Beningfield et al.

[11] 4,390,949

[45] Jun. 28, 1983

[54] ELECTRONIC SYSTEM AND METHOD FOR SELF-CALIBRATION OF INSTRUMENT LANDING SYSTEMS

[75] Inventors: Harley W. Beningfield, Satellite Beach; Donna F. Wilt, West Melbourne, both of Fla.

[73] Assignee: Rockwell International Corporation, El Segundo, Calif.

[21] Appl. No.: 267,222

[22] Filed: May 26, 1981

[51] Int. Cl.³ .............................................. G06G 7/78
[52] U.S. Cl. ................................... 364/429; 244/186; 244/194; 364/571
[58] Field of Search .............. 364/428, 429, 571, 573; 371/27; 244/186, 194, 195

[56] References Cited

U.S. PATENT DOCUMENTS

| | | | |
|---|---|---|---|
| 3,678,256 | 7/1972 | Harenberg, Jr. ................... | 364/428 |
| 3,757,338 | 9/1973 | Liebman ......................... | 244/186 X |
| 3,806,934 | 4/1974 | Hays, Jr. ........................ | 364/429 X |
| 3,918,662 | 11/1975 | Vircks et al. .................... | 364/429 X |

*Primary Examiner*—Jerry Smith
*Attorney, Agent, or Firm*—George A. Montanye; Howard R. Greenberg; H. Fredrick Hamann

[57] ABSTRACT

A method for calibrating and correcting circuit errors induced in an aircraft ILS receiving system is disclosed herein. The spectral components of the input signal are processed through bandpass filters and then rectified and integrated in order to produce an output signal representative of the deviation from the desired centerline course. First and second test signals are generated corresponding to first and second known positions. These test signals are sequentially processed in the same manner as the operational input signals in order to develop first and second position errors which represent distortion and circuit induced errors within the processing system. A corrective function is then derived for a range of operational input signals by interpolating from the first and second position errors. All subsequently processed signals are adjusted by applying the corrective function. In this manner, the various distortions that are introduced through the processing system will be measured and then subtracted from the output signals in order to define a corrected representation of deviation from the desired centerline course. Sampling periods are utilized which contain an integer multiple of cycles of each of the major frequencies present in the operational input signal.

23 Claims, 4 Drawing Figures

$\frac{t}{T}$ = DUTY CYCLE

ELECTRONIC SYSTEM AND METHOD FOR SELF-CALIBRATION OF INSTRUMENT LANDING SYSTEMS

BACKGROUND OF THE INVENTION

I. Field of the Invention

The present invention relates to aircraft avionics systems in general, and more specifically to a method and electronic system for calibrating the Instrument Landing System portion of the aircraft avionics in order to reduce operational measurement errors which are inherent in the system.

II. Description of the Prior Art

Instrument landing systems provide path guidance to a runway by radiating a VHF localizer signal which defines the extended runway centerline and a UHF glideslope signal which defines a prescribed, obstacle-free glide path to a point on the runway. These two signals are modulated similarly by 90 Hz and 150 Hz audio tones. The signal-in-space characteristics are controlled such that, if an aircraft is on the defined centerline of either of the two components, the amplitudes of the detected 90 Hz and 150 Hz tones will be identical. As an aircraft deviates from the prescribed centerline, the amplitude of one or the other tone predominates. The difference in depth of modulation of the two tones (DDM) is proportional to the extent of deviation from the centerline. The ground transmitter facilities are arranged such that deviation to the right of a localizer course or below a glideslope results in a preponderance of 150 Hz tone.

To provide the pilot with uniformly sensitive deviation indications in different aircraft, world-wide standards have been adopted to relate tone amplitude differences to the deflection of typical flight path deviation indicators. For consistent and safe instrument approaches to a runway, both centering accuracy and deviation sensitivity of the airborne equipment are critical.

The avionics system in the typical fully-instrumented aircraft includes a VHF receiver for receiving localizer signals and a UHF receiver for receiving glide-slope signals. Each of these receivers is a separate operating entity and the present invention will utilize the signals from these receivers without substantial modification of the receivers themselves. While the present device is designed to be used with a new generation of VHF and UHF receivers, the invention could also be used with the Rockwell International/Collins Avionics GLS-350/350E Glode Slope Receiver and the Rockwell International/Collins Avionics VIR-351 Navigation receiver, among others.

In the conventional system illustrated in FIG. 1, similar electronic circuits are utilized to process the UHF glide slope and VHF localizer baseband output signals, both of which include 90 and 150 Hz signal components. The typical prior art system would process these signals in separate circuits in order to obtain d.c. output signals that are proportional to the deviation of the receiving location (the aircraft platform) from either the runway centerline or the prescribed descent path. The prior art typically utilizes active operational amplifier bandpass filters to separate the 90 and 150 Hz signal components, with the resulting output signals being rectified by a simple diode and resistor network. The output of the rectifier is then passed into the input of an operational amplifier low-pass filter in order to extract the d.c. component and to match impedance levels as required.

It is periodically necessary to align or pre-calibrate these prior art navigation systems by adjusting the relative levels between the 90 Hz and 150 Hz signals. The prior art systems accomplish this by utilizing a variable potentiometer between the two inputs to the bandpass filters in order to compensate for the differences in the gains of the bandpass filters, for differences in the turn-on voltages of the diodes, and for other operational parameters which will be different for different circuit elements chosen for the two signal paths.

It is also necessary to utilize a master gain (or deviation sensitivity adjust) control somewhere in the circuit in order to adjust the system sensitivity so that for a given voltage differential between the signals, a predetermined offset or deviation is produced in the position indicator or display for the pilot. It is extremely important that the electronic system operate in a linear fashion between the centered position and the known or calibrated offset positions so that the pilot will have an accurate indication of precisely how far his present position deviates from the desired flight path.

The problems with the prior art systems are primarily related to the number of adjustments which must be made and to the long-term stability of the components employed. The centering control and the deviation sensitivity control must be periodically adjusted in order to maintain the accuracy of the system. Also, it is difficult to obtain highly accurate performance specifications from mass-produced bandpass amplifiers due to the differences in circuit elements which are utilized therein, as well as changes caused by temperature, aging and other such factors. Any differential change in the performance of the system may not be immediately recognizable by the pilot because there is no readily available test signal to indicate when the deviation signal and/or the deviation indicator should be precisely at zero. Maintenence installations have test equipment for properly calibrating these adjustments, but this method of calibration is not only time consuming and inconvenient, but it is not useful when the pilot observes an error in high flight path readout while on a landing approach.

The present invention attempts to simultaneously calibrate both the 90 Hz and 150 Hz segments of the circuit by inserting a test signal during periodic pre-calibrations of the circuit, and then measuring the errors received in each leg of the circuit (both centering and gain variations), and then storing these measured errors in order to correct later measured results. Since the 90 Hz bandpass circuit is completely separate from the 150 Hz bandpass circuit, the absolute levels of the signals passing through each of the circuits must be critically controlled in order to obtain the amplitude error.

The applicants are unaware of any prior art references which are designed to operate in a fashion similar to the present invention. Harenberg, in U.S. Pat. No. 3,678,256, discloses a performance and failure assessment monitor which assesses overall performance of the automatic landing equipment in an aircraft flight control system. The monitor is connected to various sensors throughout the aircraft so that it can compare what the flight control system in the aircraft is accomplishing during a landing maneuver against an independent model generated within the monitor of what the flight control system should be accomplishing. The resulting comparison is displayed to the pilot as a measure of relative confidence that the landing will be accomplished properly. The disclosure of Harenberg relates to an analog-type system for modeling the function of the entire auto-pilot/landing system and does not relate specifically to eliminating distortion or other component errors in the system.

III. Theory of the Present Invention

The concept of the present invention relates to the use of a 30 Hz test rectangular waveform signal which comprises a string of harmonically related signal components which are utilized in the testing procedure. These harmonics can be regulated by carefully selecting the waveform of the test signal (that is the high period to low period ratio as illustrated in FIG. 2) in order to obtain the desired level of the 90 Hz and the 150 Hz signals in the Fourier frequency spectrum. If the amplitude of the test signal and the relative duty cycle of the "on-period" to the "off-period" of the test signal are known, then a Fourier analysis of the signal will reveal the theoretical levels of the 90 Hz and 150 Hz components. During the calibration process two test signals of the same frequency (30 Hz) and the same amplitude are utilized, but the duty cycle is changed to adjust the relative 90 Hz/150 Hz component ratios. In this manner one calibration point can be obtained for a specific ratio of the 90 Hz to 150 Hz comparison, and then a second differential comparison can be made for the second test signal. The system does not measure absolute ratios between the test signals thus derived, but instead measures the absolute d.c. voltage values produced by each of the test signals and then compares these absolute values in order to determine the error components.

With reference to FIG. 3, a plot is presented in rectangular coordinates showing the relation between "deviation" and DDM (difference in depth of modulation) of the 90 Hz and 150 Hz signals. The actual difference in amplitude of the signals corresponds directly to a voltage differential because of the modulation system utilized. If the receiving system is located directly upon the extended runway centerline, then standard calibration conventions indicate that the 90 Hz and 150 Hz components each modulate the localizer RF carrier to a depth of 20 percent. The actual difference between the voltage outputs of the respective demodulation systems should therefore be zero in the case of ideal components, etc. Hereafter, DDM will be used to express the difference in the levels of modulation of the respective 90 Hz and 150 Hz signals. Glide slope operation is similar to that of the localizer except that, when the aircraft is on the prescribed glide path, each component modulates the RF carrier to a depth of 40 percent.

With continuing reference to FIG. 3, a curve can be derived for the ideal operation of such a localizer or glide slope system, which is preferably a straight line which passes through the center origin defined at the intersection of the horizontal axis, or DDM axis, and the vertical axis representing indicator deflection from center (position error). As was previously discussed, the difference in circuit elements and the drift of circuit parameters will cause an offset of the ideal line such that the slope will change (controlled in the prior art by the gain control) and the vertical offset from the origin will also change (controlled in the prior art by the centering control). As the circuit elements drift over a period of time, or even change during flight due to short-term temperature variations, the "actual line" may change both in slope and in vertical offset. The present system attempts to derive the changes in the slope and offset of the actual line as compared to the ideal line. Presuming that the actual line is in fact a straight line, then it can be defined by measuring two points (denoted as A and B). These two measuring points correspond to the test signals as previosuly described for the two different duty cycles. The duty cycles of the test signals are judiciously chosen so that the even harmonics are minimized.

Test point A has a known DDm which is indicated at position 1 on the DDM axis. The DDM of point B is illustrated as position 2 on the DDm axis. The assumption that the actual curve is a straight line is relatively accurate as long as the signal levels at the outputs of the bandpass filters are much larger than the forward drop of the rectifier diodes. Any errors due to the actual line being non-linear are minimized by placing the two measurement points A and B on opposite sides of the vertical axis. It is also important to recognize that the linearity of the system is required primarily between and in the vicinity of points A and B since an indication of a navigational error far outside of the span between points A and B (that is measured away from the vertical axis) would not typically be indicated by a further deflection of the navigational indicator, but instead would merely tell the pilot to divert his course in a specific direction until the display again comes on scale.

The proposed calibration and testing procedure involves the first step of inserting a known test signal (having a given DDM) into the circuit and measuring the vertical offset from the horizontal axis. The next test signal (with a known but different DDM) is then inserted and the vertical offset from the horizontal axis is measured for that signal. Since the magnitude of the operating signal and its duty cycle are known, it will be possible to recreate the actual or operational line by extrapolating or interpolating a straight line connecting points A and B (which were obtained from the first and second test signals). Once this actual line has been calculated, the centering error may be derived by measuring the vertical offset at the point where the "actual line" intercepts the vertical axis. The gain error is determined by measuring the offsets of the points A and B from the vertical axis and comparing these measurements with the known or ideal offsets for the two DDM levels chosen for the calibration signals. This error signal corresponds to the deflection sensitivity of the system. Therefore, the gain errors will cause the slope of the "actual" line to change with respect to the slope of the "ideal" line.

It is important to maintain a constant amplitude for the test signals so that any gain errors will be due exclusively to the differential gains in the two systems. This may be accomplished by a simple voltage divider which is placed across a voltage regulator circuit. The output of the voltage divider is then merely switched on and off in order to determine the on and off amplitudes. The duty cycle of the on and off amplitudes is controlled by a triggering circuit.

These calculations may easily be derived from an algorithm which utilizes the measurements from points A and B. This algorithm may then be used on the actual signals in order to correct for the circuit errors. In this manner, any single measurement derived in real time will have the known constants or error signals subtracted in order to derive the actual location of the receiving platform with regard to the desired flight path. For example, if point C, as shown in FIG. 3, represents the coordinates for an actual received and measured signal, then the error signal which is subtracted from the measured C position will be generally equal to the vertical distance between point C and a point located along the ideal curve which has the same DDM or X-axis value. Therefore, the actual gain and centering errors are not known at any particular time during the operation, but the algorithm utilized will allow the vertical error signal to be easily calculated from the information available.

IV. Algorithm

With continuing reference to FIG. 3, the actual algorithm utilized in the present system may be explained as follows. DDM 1 and DDM 2 are the known differences in the depth of modulation of the two calibration signals. A and B are the Y-axis values of the measured outputs of the respective circuits for these two test signals. The actual or real time measurement is designated as point C (Y-axis value). The derivation of the algorithm is as follows:

(TABLE 1)

$$\frac{B - A}{DDM2 - DDM1} = \frac{C - A}{DDM3 - DDM1}$$

$$\frac{DDM3 - DDM1}{C - A} = \frac{DDM2 - DDM1}{B - A}$$

$$\frac{DDM3}{C - A} = \frac{DDM1}{C - A} + \frac{DDM2 - DDM1}{B - A}$$

$$DDM3 \text{ (Deviation)} = DDM1 + \frac{(DDM2 - DDM1)(C - A)}{(B - A)}$$

DDM3 may be converted, with high precision, to an ideal indicator deflection.

SUMMARY OF THE INVENTION

The present invention relates to an electronic system and method for calibrating and correcting circuit induced errors in an ILS receiving system of the type which processes an operational input signal, having discrete spectral components of known frequencies and varying amplitudes which indicate position errors, in order to develop an output signal representative of deviation from a desired centerline course. According to the method disclosed herein, the desired spectral components of the operational input signal are selected with bandpass filters, individually rectified, and then recombined subtractively and filtered for producing a measured output signal representative of deviation from the desired position.

In order to calibrate and correct for circuit distortion, a first test signal is generated representative of a first known position. The first test signal includes spectral components of known amplitudes and frequencies generally corresponding to those of the operational input signals. A second test signal representative of a second known position is generated by changing the amplitude of the spectral components of the first test signal.

The first and second test signals are sequentially processed through the filtering and rectifying steps, and resulting measured deviations are compared with the known positions of the test signals. A corrective function is then derived for a range of operational input signals by interpolating from the first and second measured deviations previously derived. Subsequently processed output signals are adjusted by applying the corrective function in order to cancel gain and filtering errors introduced through the processing steps.

An electronic system in accordance with this method is also disclosed.

BRIEF DESCRIPTION OF THE DRAWINGS

Other objects, features and advantages of the present invention will be apparent from a study of the written description and the drawings in which.

Figure 1:
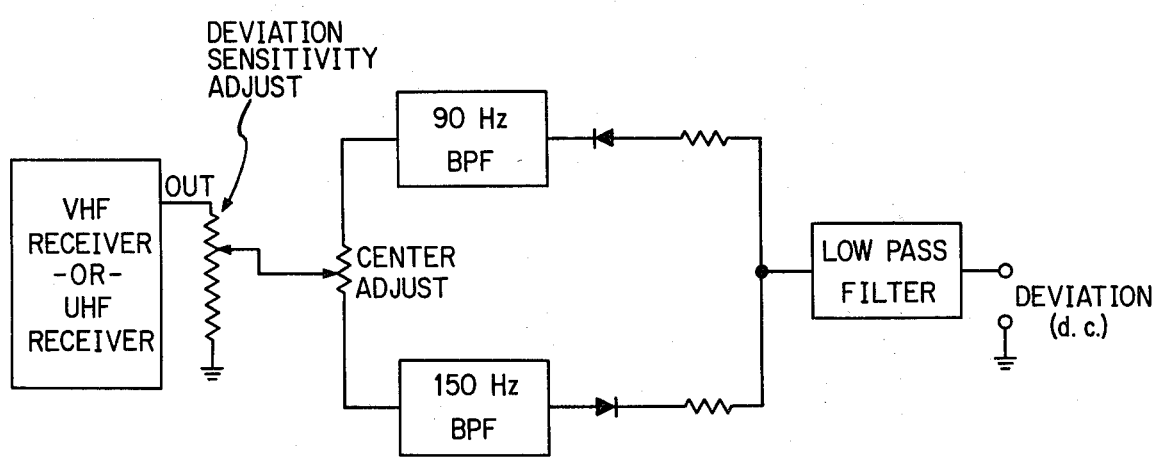
FIG. 1 represents a schematic block diagram of a prior art ILS navigation system.
Figure 2:
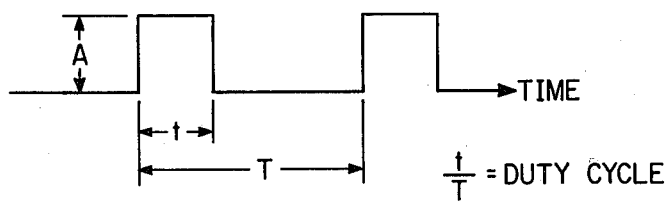
FIG. 2 illustrates the rectangular waveform and duty cycle characteristics of the two test signals used in accordance with the present invention.

In the drawings, like reference characters will refer to like parts throughout the several drawings of each of the embodiments of the present invention. However, variations and modifications may be effected without departing from the spirit and scope of the concept of the disclosure, and as defined by the appended claims. It should also be observed that the elements and operation of the embodiments of the present invention have been illustrated in somewhat simplified form in each of the drawings and in the following specification in order to eliminate unnecessary and complicating details which would be apparent to one skilled in this art. Therefore, other specific forms and constructions of the invention will be equivalent to the embodiments described although departing somewhat from the exact appearance of the drawings.

DETAILED DESCRIPTION OF THE PREFERRED EMBODIMENT

Figure 4:
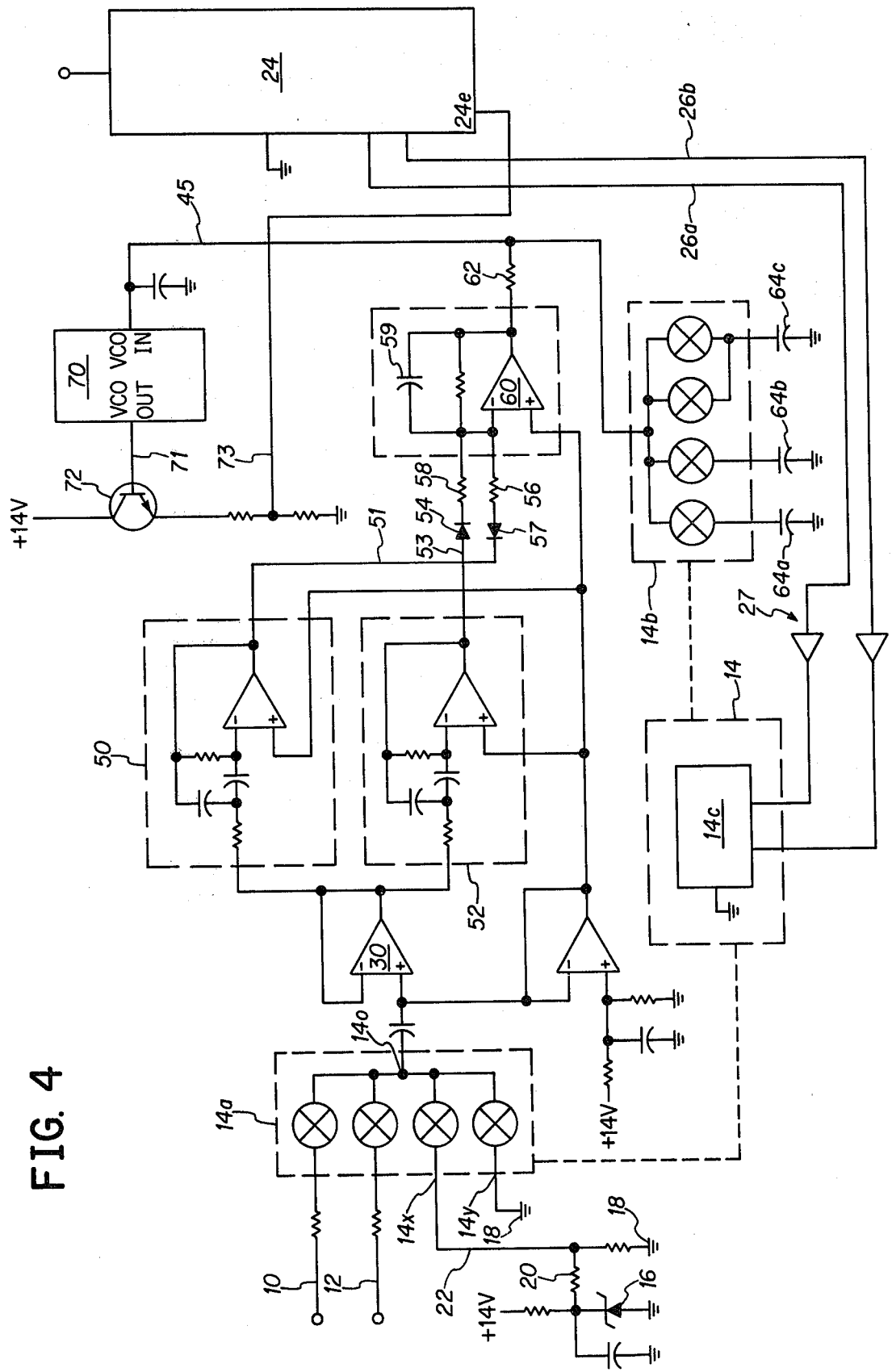
FIG. 4 illustrates a schematic block diagram of a first preferred embodiment of the electrical circuitry in accordance with the present invention.

A first preferred embodiment of the invention is illustrated generally in FIG. 4. This first preferred embodiment will be described in accordance with the concepts and systems theory which has been discussed above.

It will first be presumed that 90 Hz and 150 Hz signals are summed at the detector of the receiver for the particular frequency being received. The output of the VHF localizer receiver is coupled into the present system on line 10. The composite output from the glide slope receiver is coupled into the system through line 12. A time devision multiplexing circuit 14a receives the localizer output 10 and the glide slope output 12 and will switch between these sources in order to make independent measurements of each of these signals. This time division multiplexer 14a serves another purpose in that, under control by the microprocessor, it will also provide the synchronous switching between the reference voltage level and ground in order to generate the rectangular waveform test signal. While this is a matter of circuit convenience, the synchronous switching is important for maintaining the proper control of the testing function. The time division multiplexer 14a is typically a portion of a 4052 integrated circuit chip.

The test signal is generated by taking the output reference voltage from a zener diode 16 and coupling it through a voltage divider composed of resistors 18 and 20. This output voltage is then coupled through circuit conductor 22 to a third input 14x of the time division multiplexer. A fourth input line 18 is coupled between ground potential and a fourth input 14y of the time division multiplexer 14a.

When the microprocessor 24 senses a change in the ILS receiver frequency, it will generate an output signal along circuit conductors 26a and b. These output lines carry various binary switching information through appropriate buffer amplifiers 27 to the appropriate switching controller 14c which is part of the time division multiplexer 14. While these switchers are shown as being separated from the time division multiplexer 14, they are actually part of the multiplexer 14 and are separated merely for the purposes of clarity in the schematic diagram. When the microprocessor 24 senses that a new ILS frequency has been selected, it will generate a 30 Hz signal of the proper duty cycle which is developed internally from a crystal controlled source and frequency divider network. Since multiple control functions are required, various control output signals also will be generated. For the purpose of generating the test signal, the 30 Hz signal of interest is generated along line 26b which is coupled to switcher 14c. This 30 Hz signal which drives the switcher 14c will cause the multiplexer 14a to switch its output 14o between the inputs on lines 18 and 22. Thus, the output of the multiplexer 14a will be a rectangular waveform signal of known amplitude, determined by the zener 16 and the voltage divider 18 and 20, and of a known duty cycle, determined by the microprocessor 24 which drives the switch 14c.

In the first preferred embodiment of the present invention, the first test signal has a frequency of 30 Hz and a duty cycle of 50 percent, indicating that the positive voltage is present for ½ of the cycle and the other half of the cycle is at ground potential. The second test signal has the same 30 Hz frequency, but the duty cycle is changed to 32 percent. With regard to the first test signal, the output waveform is present for 800 milliseconds. This time period is required in order to allow the voltage level in each of the analog circuits within the system to achieve and maintain their steady state value (with provisions made for the decay of all ringing and other transient switching signals.)

The output of the multiplexer 14a may therefore be switched by the operation of the microprocessor 24 between the inputs to the multiplexer, namely the VHF localizer output 10, the UHF glide slope output 12, and the 30 Hz rectangular waveform test signals of various duty cycles used for calibration. The output of the multiplexer 14a is coupled through a buffer amplifier 30. The output of the buffer amplifier 30 is coupled into the two bandpass filters shown generally as 50 (nominally the 90 Hz filter) and the second bandpass filter 52 (nominally the 150 Hz filter). As previously discussed, each of these bandpass filters is well known in the art and comprises an operational amplifier with appropriate feedback so as to define a relatively sharp filtering function around the desired center frequency.

The output of the first bandpass filter 50 is coupled through the circuit conductor 51, through a rectifying diode 57 and a summing resistor 56 to the input of an operational amplifier 60. In a similar manner the output of the second bandpass filter 52 is coupled through a circuit conductor 53, through a rectifying diode 54 and a summing resistor 58 to the same input of the operational amplifier 60. The summing resistors 56 and 58, when taken together with the other feedback elements of the operational amplifier 60, will determine the gain and frequency response of the filter. The operational amplifier 60 is used both as a summing amplifier and as an integrator in order to reduce the 90 Hz and 150 Hz ripple components, and harmonics thereof, produced by the rectification process.

Figure 3:
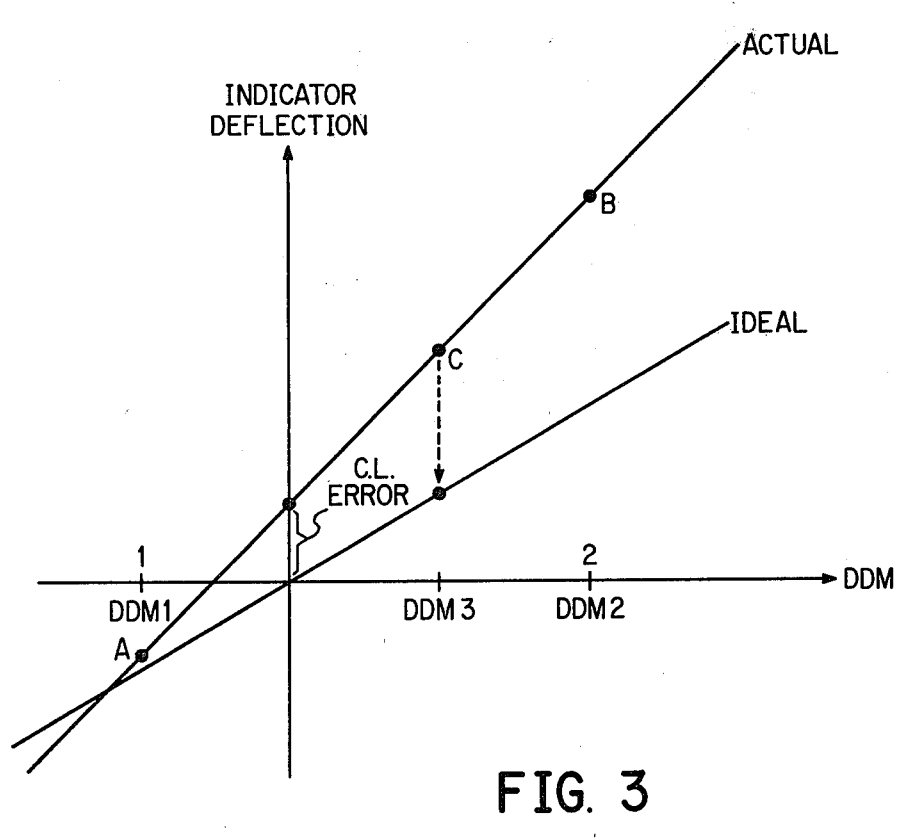
FIG. 3 is a plot in rectangular coordinates of the actual versus ideal deviation signals for various DDM levels of the input signals.

The output of the integrator 60 is a DC voltage representative of the DDM value for the signal along the X-axis of the plot illustrated in FIG. 3. This output voltage is coupled through a resistor 62 and capacitor 64c which form a low pass filter with a time constant which is substantially longer than any ripple frequency which may be present upon the output of the amplifier 60.

The DC output level from the low pass filter is coupled through the circuit conductor 45 to a first input of a phase locked loop voltage controlled oscillator 70 which is used as a voltage to frequency convertor. Therefore, the DC output voltage from the integrator 60 will be converted by the voltage controlled oscillator (VCO) 70 to a frequency which is dependent upon the deviation from the desired or nominal flight path. The standard output frequency of the VCO 70 is nominally 80 kHz. Since the frequency of the output signal of the VCO 70 is measured and processed by the same microprocessor 24 which generates the other frequencies used throughout the system, any drift or other undesirable change of this 80 kHz signal frequency will be cancelled out and compensated for by programming in the microprocessor 24.

The output of the VCO 70 is coupled through a circuit conductor 71 to the input of a transistor 72 which is utilized in a buffer amplifier arrangement for adjusting and matching the voltage and impedance requirements of the various circuit subsystems. The output of the amplifier 72 is coupled through a circuit conductor 73 back to an auxiliary input 24e of the microprocessor 24. The microprocessor 24 is programmed to count the output frequency of the VCO 70 for exactly one-thirtieth of a second at the end of each 800 millisecond calibration period. The earlier portion of the calibration period is utilized only to charge all of the capacitors and other circuit elements to their steady state value.

The one-thirtieth second counting interval is chosen to minimize the effect of ripple on the DC voltage controlling VCO 70. Ripple produces undesired frequency modulation of the VCO output, which could result in an erroneous count, not exactly proportional to the DC voltage component. During one cycle of any sinusoidal ripple component, however, the VCO frequency will be low for one-half the time and high, by an equal amount, for the other half. If the counting interval spans an integer number of cycles of a ripple component, then, that ripple component will not affect the accuracy of the measurement. The one-thirtieth second counting interval spans an integer number of cycles of every ripple component produced by the 90 Hz and 150 hz signal components, so the resultant count is truly proportional to the DC component of the control voltage. Integer multiples of one-thirtieth second, such as one-fifteenth second or one-tenth second, would produce the same result, and could be used if desired.

Returning now to the calibration mode, the microprocessor 24 will first count the number of cycles received during the one-thirtieth second sampling window, with this number of cycles being proportional to the DC voltage produced on circuit conductor 45 by the 90 Hz and 150 Hz components of the first calibration signal. This number is digitally stored in the microprocessor 24 and will correspond to point B illustrated on FIG. 3. It must be recalled that point B corresponds to the 50 percent duty cycle signal which has been generated and measured during the first 800 millisecond test period.

It will then be necessary to initiate a second 800 millisecond test and calibration period corresponding to the 32 percent duty cycle test signal for measuring the parameters required for point A as illustrated in FIG. 3. The sampling of the error signal during the test calibration window is identical to the one previously described and will produce a number stored in the microprocessor 24 representative of the output frequency of the VCO 70 which is proportional to the DC voltage produced by the 90 Hz and 150 Hz components of this second calibration signal. This second number will represent the value of the test signal at point A illustrated in FIG. 3. Therefore, the terms A, B, DDM1, and DDM2 in the algorithm have now been provided during the two 800 millisecond test periods.

After the test and calibration cycle, the microprocessor 24 will switch into an operational mode. Since the duty cycles and amplitude (hence DDM1 and DDM2) for each of the calibration signals are known, and since the VCO frequencies for each of the respective duty cycles have been determined and have been stored in RAM cells in the microprocessor 24, the algorithm (see Table 1) as described previously can now be invoked on a real-time basis. The input variable is the frequency which is actually measured by the system from the 90 Hz and 150 Hz signals from the receiver. Then this value is inserted into the algorithm, the output or final value of the algorithm is representative of a point lying along the ideal line, as illustrated in FIG. 3, with the same X or DDM value as the real-time measurement. Thus, the actual deviation from the center line or desired flight path has been calculated using the algorithm and the stored values in order to determine circuit drift and other variables which must be eliminated from the calculations in order to provide an exact deviation measurement.

In the preferred embodiment, shown in FIG. 4, localizer and glide slope deviation measurements are made alternately. A 200 millisecond sampling period is dedicated to a localizer measurement, the next 200 millisecond period to a glide slope measurement, the following to localizer, etc. In this manner, each component of the instrument landing system is sampled every 400 milliseconds. This sampling rate is rapid enough that changes in the positions of the deviation indicators appear to be continuous.

To make deviation measurements, the microprocessor 24 applies control signals to time division multiplexer 14 to cause it to select either the localizer signal on line 10 or the glide slope signal on line 12. Simultaneously, the time division multiplexer selects capacitor 64a for localizer operation, or capacitor 64b for glide slope operation. These capacitors, in conjunction with resistor 62, filter the DC voltage applied to VCO 70, and provide a sample-and-hold function to minimize settling time as the circuit switches back and forth between localizer and glide slope operation.

Within each 200 millisecond sampling interval, the first 167 milliseconds are allowed for circuit stabilization to a steady-state condition, and the measurement is made during the last one-thirtieth second. The microprocessor 24 arithmetically filters the digital representations of the deviation from the localizer and glide slope centerlines to minimize the effects of perturbations in the received signals, and generates outputs which control deviation indicators. In the preferred embodiment, these outputs are serial bit digital words which convey the deviation information to a digital flight path deviation indicator. In alternative embodiments, these outputs could be in parallel digital form, with several bits simultaneously present on a plurality of circuit conductors, or voltage or current analogs of deviation, produced by applying the digital output from the microprocessor 24 to standard digital-to-analog converter devices.

Since there are two deviation indicators, one for left to right and the other for altitude deviation, the microprocessor 24 will be required to alternately provide the information to the appropriate deviation indicators. However, since both of these deviation measurements are processed through the same 90 Hz and 150 hz bandpass filters and the same voltage measurement circuits, only one set of calibration measurements will be required in order to provide complete error cancellation information for the aforementioned algorithm. The microprocessor 24 will be programmed such that separate RAM memories will be provided for the left to right and for the vertical deviation displays. Each of these displays will be updated during every other 200 millisecond period.

The preferred embodiment of the self-calibrating ILS system has been described as an example of the invention and the method as claimed. However, the present invention should not be limited in its application to the details and constructions illustrated in the accompanying drawings and the specification, since this invention may be practiced or contructed in a variety of other different embodiments. Also, it must be understood that the terminology and descriptions employed herein are used solely for the purpose of describing the general system and the preferred embodiment thereof, and therefore should not be construed as limitations on the invention or its operability.

We claim:

1. A method for correcting circuit induced errors in a navigation system of the type in which an operational input signal, having discrete spectral components each of known frequency and varying amplitude, is processed through frequency selective circuits in order to produce an output signal representative of deviation from a desired position, said method comprising the steps of:

A. generating a first test signal representative of a known first position, said first test signal including a plurality of spectral components having frequencies generally corresponding to those of the operational input signal and having known amplitudes;

B. processing said first test signal through the frequency selective circuits in order to derive a first position error corresponding to said known first position;

C. changing the amplitude of said spectral components of said first test signal so as to produce a second test signal representative of a second known position;

D. processing said second test signal through the frequency selective circuits in order to derive a second position error corresponding to said known second position;

E. deriving an error corrective function, effective over a range of operational input signals, from said first and second position errors; and F. modifying the output signal from the frequency selective circuits with said error correction function for all subsequently processed operational input signals so as to correct for position errors introduced by processing.

2. The method as described in claim 1 wherein step A includes the substep (A1) of generating said first test signal as having a periodic rectangular waveform with a repetition frequency which is a submultiple of the frequency of each of the discrete spectral components of the operational input signal.

3. The method as described in claim 2 wherein step C includes the substep (C1) of changing the duty cycle of said periodic retangular waveform signal, whereby the Fourier transform of said first and second test signals will yield known amplitude relationships between said spectral components therein.

4. The method as described in claim 3 wherein step E includes the substep (E1) of linearly extrapolating said corrective function as a straight line through said first and second position errors for all expected values of the operational input signal.

5. The method as described in claim 4 further comprising step G of alternately processing, as the operational input signal, the output signals from a localizer receiver and then from a glide slope receiver for deriving output signals representative of lateral and vertical deviations from the desired position, whereby said corrective function may be utilized for deriving both vertical and horizontal error output signals.

6. A method for correcting circuit induced errors in an ILS receiving system of the type which processes an operational input signal, having discrete spectral components of known frequency and varying amplitudes, in order to develop an output signal representative of deviation from a desired centerline course, said method comprising the steps of:
   A. filtering each of the discrete spectral components through bandpass filters for removing noise and distortion products;
   B. rectifying said filtered discrete components and filtering a recombined signal, comprising DC components resulting from rectification, for deriving the output signal;
   C. generating a first test signal representative of a known first position, said first test signal having spectral components of known amplitude and frequencies generally corresponding to the spectral components of the operational input signals;
   C. processing said first test signal through steps A and B in order to derive a first processing error corresponding to said first known position;
   E. generating a second test signal, representative of a second known position, by changing the amplitude of the spectral components of said first test signal;
   F. processing said second test signal through steps A and B in order to derive a second processing error corresponding to said second known position;
   G. deriving an error corrective function representative of said processing errors for a range of operational input signals by interpolating from said first and second processing errors; and
   H. processing the operational input signals through steps A and B and then applying said corrective function to the output signal so as to eliminate said processing errors therefrom.

7. The method as described in claim 6 wherein step (B) further includes the substep of:
   (B1) sampling said recombined signal after said rectifying and filtering processes in order to obtain a generally steady state sampling level representative of the output signal, with said sampling occurring for a first sampling period which includes an integer number of cycles of each of the spectral components of the operational input signal, whereby any residual ripple components will be cancelled over the sampling period.

8. The method as described in claim 7 wherein step B further includes the substeps of:
   (B2) generating a periodic output signal having a frequency determined by said sampling level obtained during said first sampling period; and
   (B3) counting the frequency of said periodic output signal for a second sampling period, thereby defining a digital value for the output signal representative of deviation from the desired centerline course.

9. The method as described in claim 8 further including the substep of regulating said second sampling period to include an integer number of cycles of each of the spectral components of the operational input signal, thereby further reducing the effects of any residual ripple components.

10. The method as described in claim 9 further including the substep of regulating said first sampling period of step (B1) to equal said second sampling period of step (B3).

11. The method as described in claim 9 wherein step (C) includes the substep (C1) of generating a periodic rectangular waveform signal having a repetition frequency which is a submultiple of the frequencies of each of the multiple discrete spectral components of the operational input signal.

12. The method as described in claim 11 wherein step (E) includes the substep (E1) of changing the duty cycle of said periodic rectangular waveform signal, whereby the Fourier transform of said first and said second test signals will yield known amplitude relationships between said spectral components therein.

13. The method as described in claim 12 further including the step of generating a master timebase signal for controlling;
   (a) the repetition frequency of said first and second test signals; and
   (b) the duty cycles of said first and second test signals.

14. The method as described in claim 13 wherein step (B1) further includes the substep of determining said first and second sampling periods through reference to said master timebase signal.

15. An improved system for correcting circuit induced errors in an ILS receiving system of the type wherein an operational input signal, of the type having discrete major spectral components of known frequency and varying amplitudes representative of position errors, is processed through processing circuits in order to develop an output signal representative of deviation from a desired centerline course, wherein the improvement comprises;
   signal generator means for generating a first test signal, representative of a first known position, having major spectral components of known amplitude and frequencies generally corresponding to the major spectral components of the operational input signal, and for generating a second test signal, representative of a second known position, by changing the amplitude of the major spectral components of said first test signal;

switching means for inserting said first test signal into the signal processing circuits in order to derive a first processing error corresponding to said first known position, and for inserting said second test signal into the signal processing circuits in order to derive a second processing error corresponding to said second known position; and computer means for receiving said first and second processing errors and responsive thereto deriving an error corrective function representative of a range of said processing errors corresponding to a range of the operational input signals, with said computer means further including error correcting means for receiving and then modifying the output signal with said error corrective function for eliminating the processing errors therefrom.

16. The improvement as described in claim 15 wherein said first and second test signals have periodic and generally rectangular waveforms with a repetition frequency which is a submultiple of each of the discrete spectral components of the operational input signal.

17. The improvement as described in claim 16 wherein said signal generator means includes means for changing the duty cycle of said first test signal in order to form said second test signal, whereby the Fourier transform of said first and second test signals will yield known amplitude relationships between corresponding ones of said spectral components therein.

18. The improvement as described in claim 17 wherein said repetition frequency is 30 Hz when the operational input signal includes 90 Hz and 150 Hz major spectral components.

19. The improvement as described in claim 17 wherein said error correcting means further includes means for sampling the output signal in order to obtain a generally steady state representation thereof, with said sampling occurring for a first period which includes an integer number of cycles of each of the major spectral components of the operational input signal, whereby any residual ripple components should be cancelled over the sampling period.

20. The improvement as described in claim 19 wherein said error correcting means further includes:

means for generating a periodic output signal having a variable frequency representative of the level of the output signal during said first sampling period;

means for counting the frequency of said periodic output signal for a second sampling period, thereby defining a digital value for the output signal representative of deviation from the desired centerline course.

21. The improvement as described in claim 20 wherein said second sampling period includes an integer number of cycles of each of the major spectral components of the operational input signal, thereby further reducing the effects of any residual ripple components.

22. The improvement as described in claim 21 wherein said error correcting means further includes a master timebase generator for generating a master timebase signal coupled to said signal generator means for controlling the repetition frequency and duty cycle of said first and second test signals.

23. The improvement as described in claim 22 wherein said master timebase generator is coupled to said error correcting means for controlling said first and second sampling periods responsive to said master timebase signal.

* * * * *